United States Patent
Miyaki et al.

(10) Patent No.: US 7,403,371 B2
(45) Date of Patent: Jul. 22, 2008

(54) METHOD OF MAKING ELECTROCHEMICAL CAPACITOR ELECTRODE, METHOD OF MAKING ELECTROCHEMICAL CAPACITOR, AND POROUS PARTICLE WITH SOLVENT FOR USE THEREIN

(75) Inventors: Yousuke Miyaki, Tokyo (JP); Tetsuya Takahashi, Tokyo (JP); Atsuko Kosuda, Tokyo (JP)

(73) Assignee: TDK Corporation, Tokyo (JP)

( * ) Notice: Subject to any disclaimer, the term of this patent is extended or adjusted under 35 U.S.C. 154(b) by 319 days.

(21) Appl. No.: 10/547,928

(22) PCT Filed: Apr. 22, 2004

(86) PCT No.: PCT/JP2004/005795

§ 371 (c)(1),
(2), (4) Date: Sep. 8, 2005

(87) PCT Pub. No.: WO2004/095480

PCT Pub. Date: Nov. 4, 2004

(65) Prior Publication Data

US 2006/0133005 A1    Jun. 22, 2006

(30) Foreign Application Priority Data

Apr. 23, 2003 (JP) .............................. 2003-119017

(51) Int. Cl.
*H01G 9/00* (2006.01)

(52) U.S. Cl. .................. 361/503; 361/502; 361/504; 361/516; 361/523; 361/525

(58) Field of Classification Search ......... 361/502–504, 361/508–512, 516–519, 523–534; 29/25.01, 29/25.03
See application file for complete search history.

(56) References Cited

U.S. PATENT DOCUMENTS

| 5,557,497 | A | * | 9/1996 | Ivanov et al. | 361/502 |
| 5,734,020 | A | * | 3/1998 | Wong | 530/350 |
| 5,864,006 | A | * | 1/1999 | Ormand et al. | 528/196 |
| 5,973,913 | A | * | 10/1999 | McEwen et al. | 361/523 |
| 6,150,455 | A | * | 11/2000 | Takamiya et al. | 524/566 |
| 6,303,249 | B1 | * | 10/2001 | Sonobe et al. | 429/231.4 |
| 6,426,865 | B2 | * | 7/2002 | Kasahara et al. | 361/512 |
| 6,475,670 | B1 | * | 11/2002 | Ito | 429/217 |

FOREIGN PATENT DOCUMENTS

| JP | A 59-3913 | 1/1984 |
| JP | A 63-190318 | 8/1988 |

(Continued)

*Primary Examiner*—Nguyen T Ha
(74) *Attorney, Agent, or Firm*—Oliff & Berridge, PLC

(57) ABSTRACT

The present invention provides a method of making an electrochemical capacitor electrode including a collector and an electronically conductive porous layer formed on the collector, the porous layer containing at least an electronically conductive porous particle and a binder adapted to bind the porous particle; the method including a mixing step of mixing the binder and a porous particle with a solvent including an organic solvent usable in a nonaqueous electrolytic solution, the organic solvent existing on a surface of the porous particle. The present invention also provides a porous particle with a solvent, wherein an organic solvent usable in a nonaqueous electrolytic solution exists on the surface of a porous body having an electronic conductivity.

19 Claims, 20 Drawing Sheets

FOREIGN PATENT DOCUMENTS

| | | |
|---|---|---|
| JP | A 02-210810 | 8/1990 |
| JP | A 05-283287 | 10/1993 |
| JP | A 09-045590 | 2/1997 |
| JP | A 09-148202 | 6/1997 |
| JP | A 09-270370 | 10/1997 |
| JP | A 11-329904 | 11/1999 |
| JP | A 2000-277393 | 10/2000 |
| JP | A 2001-210563 | 8/2001 |
| JP | A 2002-270466 | 9/2002 |
| JP | A 2003-051429 | 2/2003 |
| JP | A 2004-031889 | 1/2004 |

\* cited by examiner

Fig.20

| | ACTIVATED CARBON FORM | ABSORPTION PROCESSING | | CAPACITY /F·g⁻¹ | ELECTRIC RESISTANCE /Ω |
|---|---|---|---|---|---|
| | | ABSORPTION | LIQUID CONTENT IN ELECTRODE FORMING COATING LIQUID /MASS% | | |
| EXAMPLE1 | SPHERICAL | YES | 33 | 30 | 0.24 |
| EXAMPLE2 | SPHERICAL | YES | 25 | 29 | 0.23 |
| EXAMPLE3 | FIBROUS | YES | 30 | 33 | 0.25 |
| EXAMPLE4 | FIBROUS | YES | 35 | 32 | 0.27 |
| COMPARATIVE EXAMPLE1 | SPHERICAL | NO | | 27 | 0.35 |
| COMPARATIVE EXAMPLE2 | FIBROUS | NO | | 30 | 0.34 |
| COMPARATIVE EXAMPLE3 | FIBROUS | NO | | UNABLE TO FORM ELECTRODE | |

METHOD OF MAKING ELECTROCHEMICAL CAPACITOR ELECTRODE, METHOD OF MAKING ELECTROCHEMICAL CAPACITOR, AND POROUS PARTICLE WITH SOLVENT FOR USE THEREIN

TECHNICAL FIELD

The present invention relates to a method of making an electrochemical capacitor electrode, a method of making an electrochemical capacitor, and a porous particle with a solvent for use in them.

BACKGROUND ART

Since electrochemical capacitors such as electric double layer capacitors can easily reduce their size and weight, they are expected to become power supplies and backup power supplies for portable devices (small-size electronic devices) and auxiliary power supplies for electric cars and hybrid cars, for example, and various studies have been under way in order to improve their performances.

In particular, for responding to recent demands for reducing the size and weight of portable devices and the like, there have been needs for developing electrochemical capacitors which can further reduce their size and weight so as to be placed in a smaller space while keeping performances required for devices to which the electrochemical capacitors are to be mounted. Namely, electrochemical capacitors are required to improve their energy density per unit mass and per unit volume.

For realizing improved performances and reduced size and weight in electrochemical capacitors, electrodes within the electrochemical capacitors have also been desired to improve performances and reduce their size and weight.

Known as a technique for manufacturing an electrochemical capacitor electrode and electrochemical capacitor intended for improving the electrode characteristics mentioned above is one comprising the steps of shaping a kneaded product composed of an electrolyte powder contained in a nonaqueous electrolytic solution (a solution employed in the electrochemical capacitor), a conductive powder (activated carbon, carbon, or the like), and a binder into a sheet as a shaped article (electrode material), and impregnating this shaped article with an organic solvent of the same species as with the organic solvent contained in the nonaqueous electrolytic solution, so as to inject the nonaqueous electrolytic solution sufficiently into an electrode, thereby reducing the internal resistance and fluctuations in characteristics (see, for example, Japanese Patent Application Laid-Open No. HEI 5-283287 (Claim 2)).

DISCLOSURE OF THE INVENTION

The inventors have found that even the manufacturing method disclosed in Patent Document 1 mentioned above fails to reduce the internal resistance of the resulting electrode fully and thus has not attained sufficient electrode characteristics yet, whereby the electrochemical capacitor mounted with the electrode made by this method cannot achieve sufficient charging/discharging characteristics.

Therefore, it is an object of the present invention to provide a method of making an electrochemical capacitor electrode which can easily and reliably form an electrode having a sufficiently reduced internal resistance and excellent electrode characteristics, a method of making an electrochemical capacitor which can easily and reliably form an electrochemical capacitor having excellent charging/discharging characteristics, and a porous particle with a solvent for use in them.

The inventors conducted diligent studies in order to achieve the above-mentioned object and, as a result, have further found that the above-mentioned manufacturing method disclosed in Japanese Patent Application Laid-Open No. HEI 5-283287 does not sufficiently reduce the contact resistance between the sheet-shaped article (electrode material) and a collector, which becomes a major cause of the problem mentioned above.

The inventors have also found that, since the kneaded product composed of an electrolyte powder, a conductive powder (activated carbon, carbon, or the like), and a binder is formed into a sheet-shaped article in the above-mentioned manufacturing method disclosed in Japanese Patent Application Laid-Open No. HEI 5-283287, the dispersibility of the conductive powder and binder is insufficient, so that a large part of the conductive particle surface is not effectively used for forming an electric double layer, which becomes another major cause of the above-mentioned problem. Namely, the inventors have found that a large part of the conductive powder surface is covered with the binder and thus fails to come into contact with the nonaqueous electrolytic solution.

The inventors further conducted studies and, as a result, have found that carrying out the following absorbing step or preparing the following porous particle with a solvent beforehand is quite effective for achieving the above-mentioned object, thereby achieving the present invention.

Namely, in one aspect, the present invention provides a method of making an electrochemical capacitor electrode comprising a collector and an electronically conductive porous layer formed on the collector while in electric contact therewith, the porous layer containing at least an electronically conductive porous particle and a binder adapted to bind the porous particle; the method comprising an absorbing step of causing the porous particle to absorb an organic solvent usable in a nonaqueous electrolytic solution so as to yield a porous particle with a solvent including the organic solvent existing on a surface of the porous particle before a mixing step of mixing the porous particle and the binder. In another aspect, the present invention provides a method of making an electrochemical capacitor electrode comprising a collector and an electronically conductive porous layer formed on the collector while in electric contact therewith, the porous layer containing at least an electronically conductive porous particle and a binder adapted to bind the porous particle; the method comprising a mixing step of mixing the binder and a porous particle with a solvent including an organic solvent usable in a nonaqueous electrolytic solution, the organic solvent existing on a surface of the porous particle.

The "organic solvent" in the absorbing and mixing steps in the present invention may be either a single compound or a mixture of two or more species of compounds as long as they are liquid organic compounds which are constituents of organic solvents usable in nonaqueous electrolytic solutions. The "nonaqueous electrolytic solution" refers to a nonaqueous electrolytic solution usable in electrochemical capacitors such as electric double layer capacitors, and nonaqueous electrolyte batteries such as lithium ion secondary batteries. The "organic solvent existing on a surface of the porous particle" refers to not only a case where the organic solvent covers the whole surface of the porous particle, but also cases where the organic solvent partly covers the surface of the porous particle and where droplets made of the organic solvent are scattered on the surface of the porous particle surface. It will be sufficient if the organic solvent exists on the surface of the porous particle. Therefore, the organic solvent may be absorbed by or attached to the porous particle surface. In the present invention, inner wall faces of pores formed in the porous particle are also included in the surface of the porous particle. More specifically, from the viewpoint of attaining the effect of the present invention more reliably and more easily, it will be preferred if the organic solvent in the absorbing or mixing step is an organic solvent of the same species as with an organic solvent contained in a nonaqueous electrolytic solution constituting an electrochemical capacitor together with the electrode. Here, the "organic solvent of the same species as with an organic solvent contained in a nonaqueous electrolytic solution constituting an electrochemical capacitor together with the electrode" may be either a single compound or a mixture of at least two species of compounds as long as they are liquid organic compounds which are constituents of an organic solvent contained in a nonaqueous electrolytic solution constituting an electrochemical capacitor together with the electrode. From the viewpoint of achieving the effect of the present invention further reliably and further easily, it will be more preferred if the organic solvent in the absorbing or mixing step is one having the same composition as with the organic solvent contained in the nonaqueous electrolytic solution constituting the electrochemical capacitor.

As mentioned above, providing the absorbing step can coat the surface of an electronically conductive porous particle with a liquid film of an organic solvent. Therefore, when the porous particle and the binder are mixed in a later step, the amount of the binder absorbed by the surface of the porous particle can fully be reduced, whereby the binder absorbed by the surface of the porous particle can attain a favorable state of dispersion. Also, if the organic solvent exists on the surface of the porous particle beforehand, the amount of the binder absorbed by the surface of the porous particle can fully be reduced when the porous particle and the binder are mixed, whereby the binder absorbed by the surface of the porous particle can attain a favorable state of dispersion. When the organic solvent is used in the absorbing step of the manufacturing method in accordance with the present invention, the decomposition of the electrolytic solution by moisture absorption or the like which becomes a problem when handling the nonaqueous electrolytic solution, and the like do not occur, whereby the operation of the absorbing step can easily be carried out without necessitating special environments such as dry rooms and glove boxes in which the moisture and species of gases occupying operation spaces are strictly controlled.

Thus, the amount of the binder absorbed by the surface of the porous particle can easily be adjusted to a level at which porous particles can fully be bound to each other while keeping a sufficient electric contact therebetween. This can reduce the amount of use of the binder as compared with conventional manufacturing methods, thereby sufficiently lowering the internal resistance of the electrode. Further, in the present invention, even a small amount of the binder in use can achieve a physically and electrically excellent adhesion between the collector and porous layer without requiring another layer for bonding the collector and porous layer to be placed therebetween. The internal resistance of the electrode can fully be reduced from this viewpoint as well, and the electrode can easily be thinned. Therefore, the manufacturing methods of the present invention can fully reduce the internal resistance of the electrode and yield an electrode having an excellent electrode characteristic easily and reliably.

In still another aspect, the present invention provides a method of making an electrochemical capacitor comprising first and second electrodes opposing each other; an insulating separator disposed between the first and second electrodes while in contact therewith; a nonaqueous electrolytic solution; and a case for accommodating the first and second electrodes, separator, and nonaqueous electrolytic solution in a closed state; wherein at least one of the first and second electrodes is made by any of the above-mentioned methods of making an electrochemical capacitor electrode.

When the electrode made by any of the above-mentioned methods of making an electrochemical capacitor electrode in accordance with the present invention is used as at least one of, preferably each of the first and second electrodes, an electrochemical capacitor having excellent charging/discharging characteristics can be formed easily and reliably.

In the present invention, a laminate in which the first electrode, separator, and second electrode opposing each other are successively laminated in this order is referred to as a "matrix". The matrix may be not only a laminate having a three-layer structure (constituted by the first electrode, separator, and second electrode), but also one constituted by five or more layers in which electrodes (first and second electrodes) and separators are alternately laminated so as to express functions of capacitors.

The "nonaqueous electrolytic solution" in the present invention may be not only one in a liquid state but also a gel-like electrolyte obtained by adding a gelling agent to the liquid-state solution.

BRIEF DESCRIPTION OF THE DRAWINGS

FIG. 20 is a chart showing a table listing results of characteristic evaluation tests concerning respective electrochemical capacitors in accordance with Examples 1 to 4 and Comparative Examples 1 to 3.

BEST MODES FOR CARRYING OUT THE INVENTION

In the following, a preferred embodiment of the manufacturing method in accordance with the present invention will be explained in detail with reference to the drawings. In the following explanation, parts identical or equivalent to each other will be referred to with numerals identical to each other without repeating their overlapping descriptions.

Figure 1:
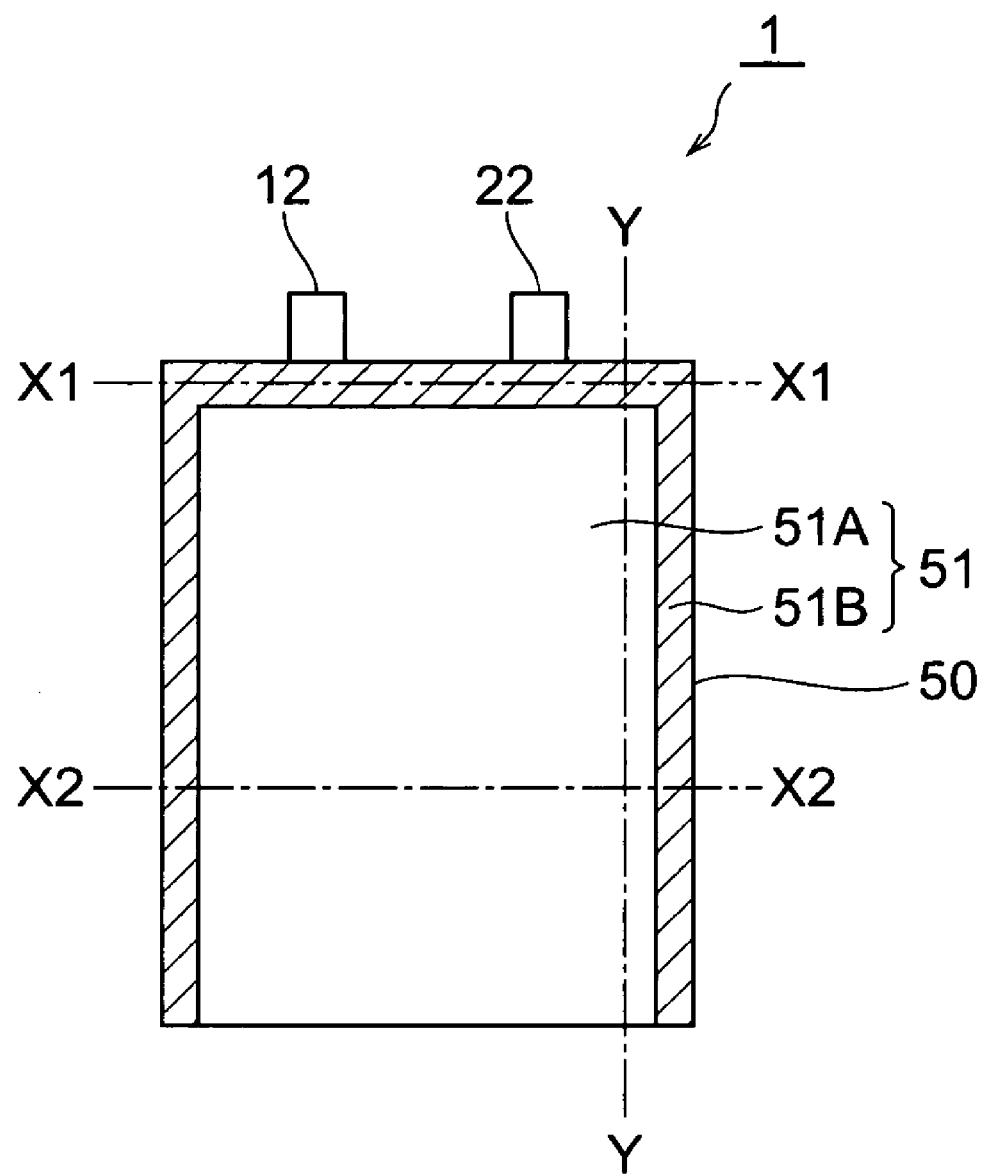
FIG. 1 is a front view showing an example of electrochemical capacitor (electric double layer capacitor) made by a preferred embodiment of the manufacturing method in accordance with the present invention.
Figure 2:
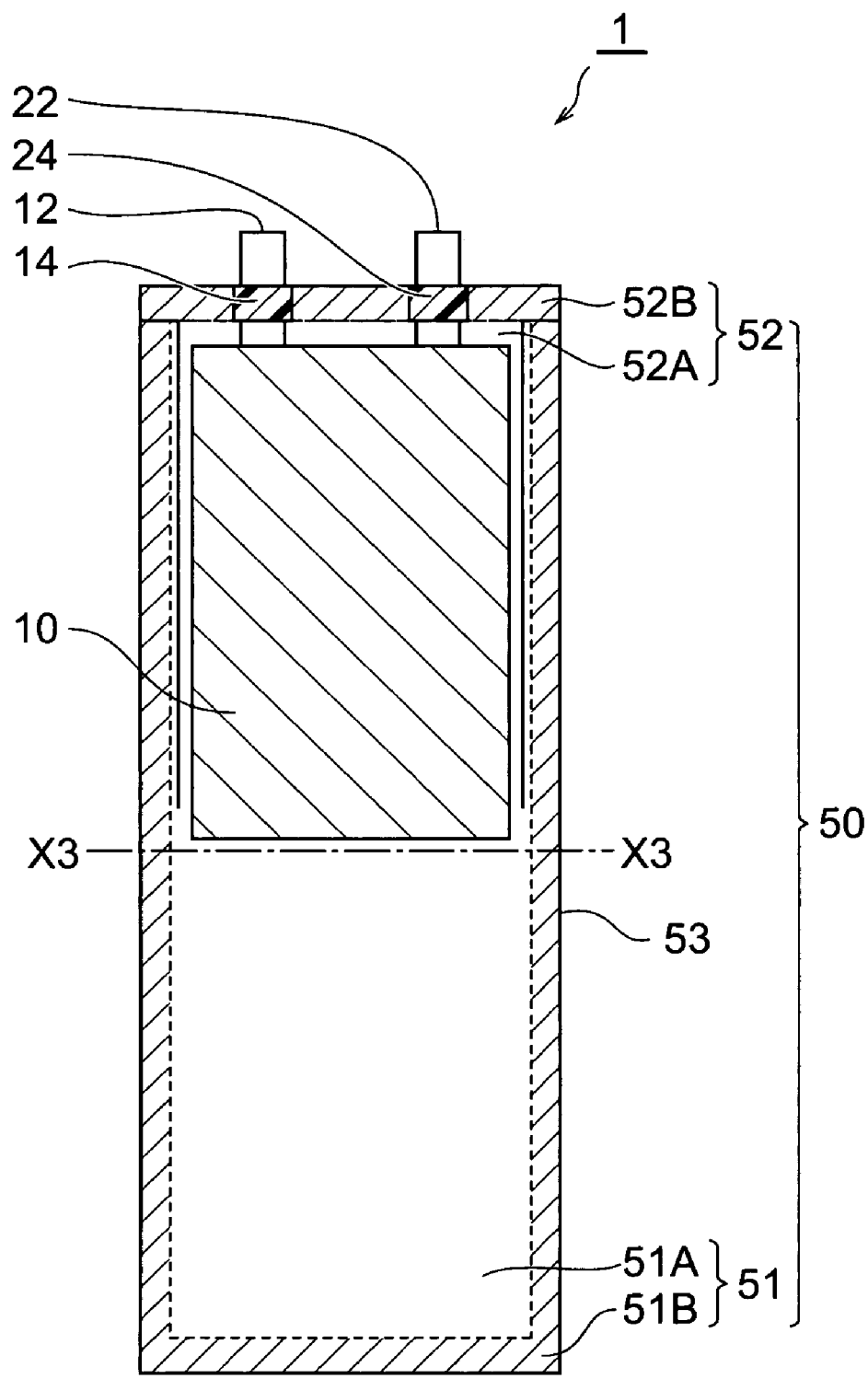
FIG. 2 is an unfolded view of the inside of the electrochemical capacitor (electric double layer capacitor) shown in FIG. 1 as seen in a normal direction of the surface of an anode 10.
Figure 3:
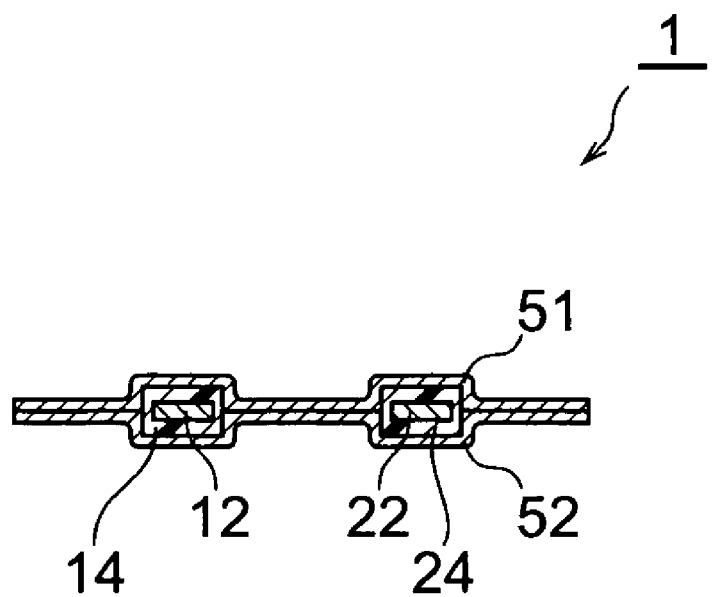
FIG. 3 is a schematic sectional view of the electrochemical capacitor (electric double layer capacitor) shown in FIG. 1 taken along the line X1-X1 of FIG. 1.
Figure 4:
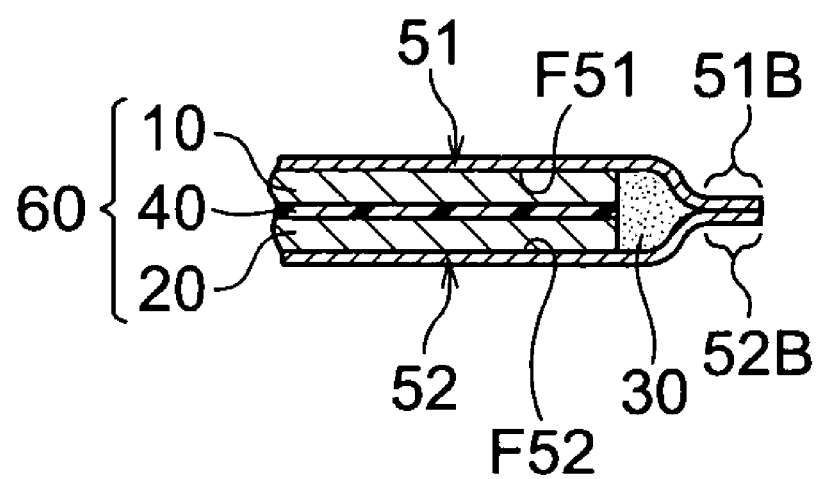
FIG. 4 is a schematic sectional view showing a major part of the electrochemical capacitor (electric double layer capacitor) shown in FIG. 1 taken along the line X2-X2 of FIG. 1.
Figure 5:
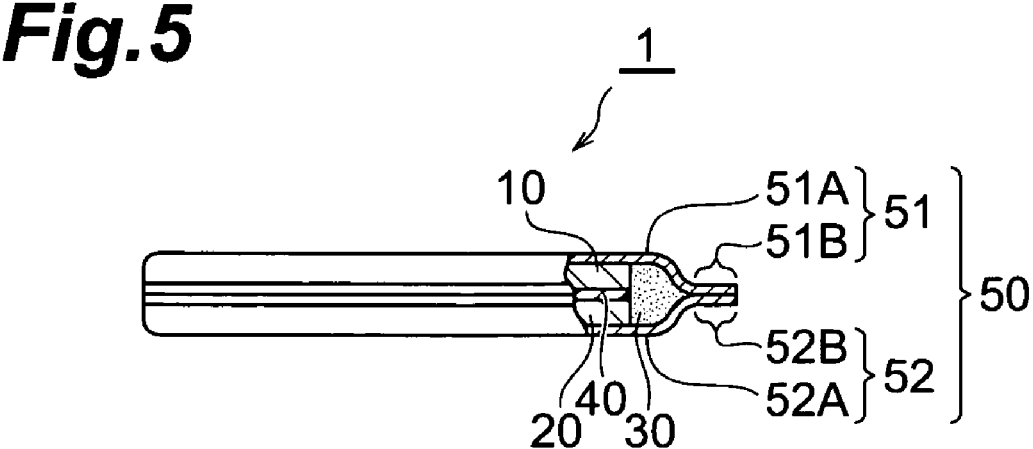
FIG. 5 is a partly broken side view of the electrochemical capacitor (electric double layer capacitor) shown in FIG. 1.

FIG. 1 is a front view showing an example of electrochemical capacitor (electric double layer capacitor) made by a preferred embodiment of the manufacturing method in accordance with the present invention. FIG. 2 is an unfolded view of the inside of the electrochemical capacitor 1 shown in FIG. 1 as seen in a normal direction of a surface of an anode 10. FIG. 3 is a schematic view of the electrochemical capacitor shown in FIG. 1 taken along the line X1-X1 of FIG. 1. FIG. 4 is a schematic sectional view showing a major part of the electrochemical capacitor shown in FIG. 1 taken along the line X2-X2 of FIG. 1. FIG. 5 is a partly broken side view of the electrochemical capacitor shown in FIG. 1, whereas the partial cross section shown in FIG. 5 indicates a major part taken along the line Y-Y of FIG. 1. FIG. 5 shows a cross section only in a part of the electrochemical capacitor taken along the line Y-Y of FIG. 1.

As shown in FIGS. 1 to 5, the electrochemical capacitor 1 is mainly constituted by a planar anode 10 (first electrode) and a planar cathode 20 (second electrode) which oppose each other, a planar separator 40 disposed between the anode 10 and cathode 20 adjacent thereto, a nonaqueous electrolytic solution 30, a case 50 accommodating them in a closed state, an anode lead 12 (first lead) having one end part electrically connected to the anode 10 and the other end part projecting out of the case 50, and a cathode lead 22 (second lead) having one end electrically connected to the cathode 20 and the other end part projecting out of the case 50. Here, for convenience of explanation, the "anode" 10 and "cathode" 20 are determined according to their polarities at the time of discharging the electrochemical capacitor 1.

The electrochemical capacitor 1 has the configuration explained in the following. Individual constituents of this embodiment will now be explained in detail with reference to FIGS. 1 to 9.

As mentioned above, the case 50 comprises a first film 51 and a second film 52 which oppose each other. As shown in FIG. 2, the first film 51 and second film 52 are connected to each other in this electrochemical capacitor 1. Namely, a rectangular film made of a single composite package film is folded at a fold line X3-X3 shown in FIG. 2, so that a pair of opposing fringes of the rectangular film (a fringe 51B of the first film 51 and a fringe 52B of the second film 52 in the drawing) are overlaid on each other, and are heat-sealed (thermally fused) in a thermally fusing step which will be explained later, whereby the case 50 is formed.

The first film 51 and second film 52 show respective film parts having surfaces (F51 and F52) opposing each other formed when the rectangular film is folded as mentioned above. Here, the respective fringes of the first film 51 and second film 52 after being joined together are referred to as "seal parts".

This makes it unnecessary to provide the part of the fold line X3-X3 with a seal part for joining the first film 51 and second film 52 together, whereby the seal parts in the case 50 can be reduced. As a result, the volume energy density based on the volume of a space where the electrochemical capacitor 1 is to be placed can be improved.

In this embodiment, as shown in FIGS. 1 and 2, respective one ends of the anode lead 12 connected to the anode 10 and the cathode lead 22 are arranged so as to project out of the seal part joining the fringe 51B of the first film 51 and the fringe 52B of the second film 52 to each other. The anode lead 12 and cathode lead 22 are heat-sealed (thermally fused) to the fringe 51B of the first film 51 and the fringe 52B of the second film 52 by using a member such as a die (not depicted). This secures a sufficient sealing property in the case 50.

The film constituting the first film 51 and second film 52 is a flexible film. The film is light in weight and easy to thin, whereby the electrochemical capacitor 1 itself can be formed into a thin film. Therefore, not only the original volume energy density, but also the volume energy density based on the volume of a space where the electrochemical capacitor 1 is to be placed can be improved easily.

This film is not restricted in particular as long as it is a flexible film. However, from the viewpoint of effectively preventing moisture and air from entering the case 50 from the outside and electrolyte components from dissipating from the inside of the case 50 to the outside while securing a sufficient mechanical strength and lightweight of the case 50, it will be preferred if the film is a "composite package film" comprising, at least, an innermost layer made of a synthetic resin in contact with the nonaqueous electrolytic solution, and a metal layer disposed on the upper side of the innermost layer.

Figure 6:
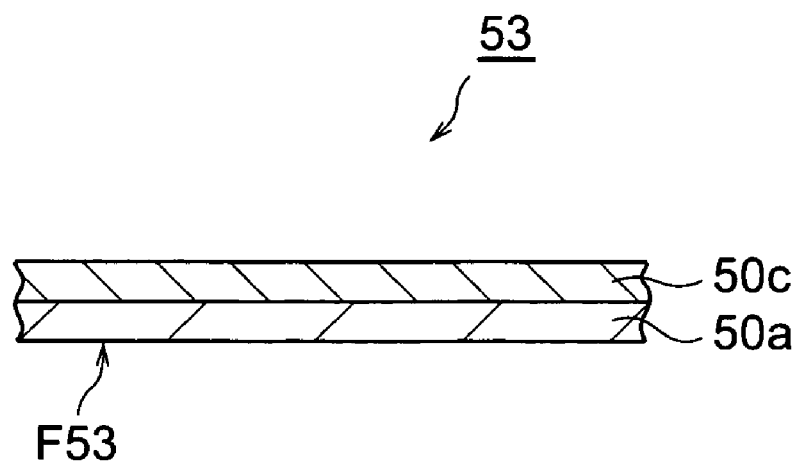
FIG. 6 is a schematic sectional view showing an example of basic configuration of a film to become a constituent material of a case of the electrochemical capacitor (electric double layer capacitor) shown in FIG. 1.
Figure 7:
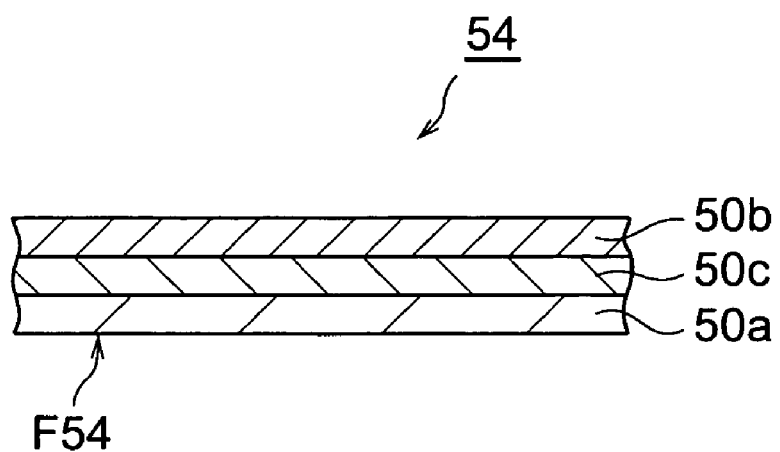
FIG. 7 is a schematic sectional view showing another example of basic configuration of the film to become a constituent material of a case of the electrochemical capacitor (electric double layer capacitor) shown in FIG. 1.

Examples of composite package films usable as the first film 51 and second film 52 include those having the respective configurations shown in FIGS. 6 and 7.

The composite package film 53 shown in FIG. 6 comprises an innermost layer 50a made of a synthetic resin having an inner face F53 in contact with the nonaqueous electrolytic solution, and a metal layer 50c disposed on the other surface (outer face) of the innermost layer 50a. The composite package film 54 shown in FIG. 7 has a configuration in which an outermost layer 50b made of a synthetic resin is further disposed on the outer face of the metal layer 50c in the composite package film 53 shown in FIG. 6.

The composite package film usable as the first film 51 and second film 52 is not restricted in particular as long as it is a composite package material including at least two layers comprising at least one synthetic resin layer such as the above-mentioned innermost layer 50a and the metal layer 50c made of a metal foil or the like. From the viewpoint of more reliably attaining the same effect as that mentioned above, however, it will be more preferred if the composite package film is constituted by at least three layers including the innermost layer 50a, the outermost layer 50b made of a synthetic resin disposed on the outer surface side of the case 50 positioned farthest from the innermost layer 50a, and at least one metal layer 50c disposed between the innermost layer 50a and the outermost layer 50b as in the composite package film 54 shown in FIG. 7.

The innermost layer 50a is a flexible layer. The constituent material of this layer is not restricted in particular as long as it is a synthetic resin which can exhibit the flexibility while having a chemical stability (a property of causing no chemical reactions, no dissolution, and no swelling) with respect to the nonaqueous electrolytic solution in use and a chemical stability with respect to oxygen and water (moisture in the air), but preferably is a material further having a characteristic of low permeability to oxygen, water (moisture in the air), and components of the nonaqueous electrolytic solution. Examples of the material include thermoplastic materials such as polyethylene, polypropylene, acid-denatured polyethylene, acid-denatured polypropylene, polyethylene ionomers, and polypropylene ionomers.

When a layer made of a synthetic resin such as the outermost layer 50b is provided in addition to the innermost layer 50a as in the above-mentioned composite package film 54 shown in FIG. 7, this synthetic resin layer may use a constituent material similar to that of the innermost layer. As this synthetic resin layer, layers made of engineering plastics such as polyethylene terephthalate (PET) and polyamide (nylon), for example, can also be used.

The method of sealing all the seal parts in the case 50 is preferably heat sealing (thermal fusion) from the viewpoint of productivity. In this electrochemical capacitor, seal parts where the anode lead 12 and cathode lead 22 project out of the case 50 in particular are sealed by heat sealing (thermal fusion).

Preferably, the metal layer 50c is a layer formed from a metal material having an anticorrosion property with respect to oxygen, water (moisture in the air), and a nonaqueous electrolytic solution. For example, metal foils made of aluminum, aluminum alloys, titanium, nickel, and the like can be used.

Figure 8:
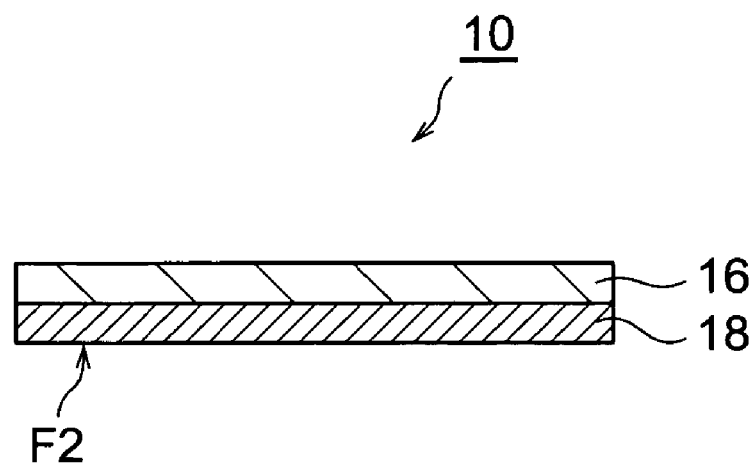
FIG. 8 is a schematic sectional view showing an example of basic configuration of an anode in the electrochemical capacitor (electric double layer capacitor) shown in FIG. 1.
Figure 9:
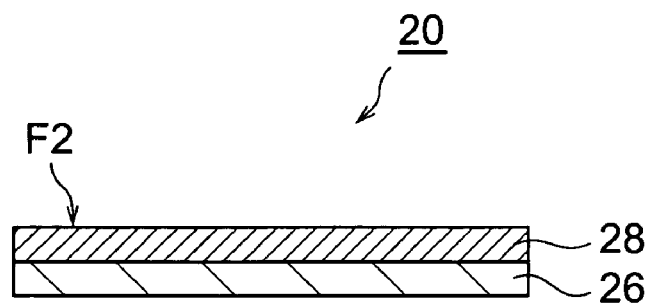
FIG. 9 is a schematic sectional view showing an example of basic configuration of a cathode in the electrochemical capacitor (electric double layer capacitor) shown in FIG. 1.

The anode 10 and cathode 20 will now be explained. FIG. 8 is a schematic sectional view showing an example of basic configuration of the anode 10 in the electrochemical capacitor shown in FIG. 1. FIG. 9 is a schematic sectional view showing an example of basic configuration of the cathode 20 in the electrochemical capacitor shown in FIG. 1. Each of the anode 10 and cathode 20 is formed by a preferred embodiment of the method of making an electrochemical capacitor electrode in accordance with the present invention.

As shown in FIG. 8, the anode 10 comprises a collector layer 16 made of a collector having an electronic conductivity, and a porous layer 18 having an electronic conductivity formed on the collector layer 16. As shown in FIG. 9, the cathode 20 comprises a collector 26 and a porous layer 28 made of an electronically conductive porous body formed on the collector 26.

The collector layer 16 and collector 26 are not restricted in particular as long as they are conductors which can sufficiently transfer electric charges to the porous layers 18 and 28, respectively, whereby collectors used in known electric double layer capacitors can be used. Examples of the collector layer 16 and collector 26 include foils of metals such as aluminum.

The porous particle having an electronic conductivity as the constituent material of the porous layers 18 and 28 is not restricted in particular, whereby porous particles similar to those used in porous layers constituting polarizable electrodes such as carbon electrodes used in known electric double layer capacitors can be employed. For example, those whose constituent materials are mainly composed of carbon materials obtained by activating coking coal (e.g., petroleum coke made by a delayed coker from material oils such as bottom oils of fluidized catalytic crackers for petroleum-based heavy oils and residual oils of vacuum distillers, carbonized phenol resins, and natural coconut shells) can be used.

The form of the porous particle having an electronic conductivity is not restricted in particular, and may be spherical (with an aspect ratio of 1 to 1.5) or fibrous (with an aspect ratio of 2 to 8), for example.

The porous layers 18 and 28 contain a binder. Preferred as such a binder is a synthetic resin which does not dissolve in an organic solvent used in an absorbing step which will be explained later. This can more reliably prevent the porous particle surface from being covered with binder particles in excess and thus failing to be used effectively. More preferred as the binder is a synthetic resin having the characteristics mentioned above and being soluble in ketone-based solvents. Examples of such ketone-based solvents include acetone, methylethylketone, methylisobutylketone, diisobutylketone, and cyclohexane.

Specifically, polytetrafluoroethylene (hereinafter referred to as "PTFE"), polyvinylidene fluoride (hereinafter referred to as "PVDF"), polyethylene (hereinafter referred to as "PE"), polypropylene (hereinafter referred to as "PP"), and fluorine-based resins are preferred as the binder. In particular, from the viewpoint of more reliably preventing the porous particle surface from being covered with binder particles and thus failing to be used effectively, fluorine-based resins which do not dissolve in the organic solvent used in the absorbing step explained later while being soluble in ketone-based solvents are more preferred.

Examples of such fluorine-based resins include copolymers containing both repeating units based on vinylidene fluoride (VDF) and tetrafluoroethylene (TFE), copolymers containing both repeating units based on VDF and hexafluoropropylene (HFP), and copolymers containing repeating units based on VDF, TFE, and HFP.

Conductive auxiliary agents (carbon black and the like) for imparting conductivity to carbon powder, for example, may be added to the porous layers 18 and 28. Namely, the porous layers 18 and 28 may contain the above-mentioned conductive auxiliary agents.

The separator 40 disposed between the anode 10 and cathode 20 is not restricted in particular as long as it is formed from a porous body having an ion permeability and an insulating property, whereby separators used in known electrochemical capacitors such as electric double layer capacitors can be employed. Examples of the insulating porous body include laminates of films made of polyethylene, polypropylene, and polyolefin, extended films of mixtures of the resins mentioned above, and fibrous nonwoven made of at least one species of constituent material selected from the group consisting of cellulose, polyester, and polypropylene.

However, from the viewpoint of fully securing a contact interface with the nonaqueous electrolytic solution, it will be preferred if the void volume of the porous layer 18 is 50 to 75 µL when the porous layer volume is 100 µL.

The collector 28 of the cathode 20 is electrically connected to one end of the cathode lead 22 made of aluminum, for example, whereas the other end of the cathode lead 22 projects out of the case 50. On the other hand, the collector 18 of the anode 10 is electrically connected to one end of the anode lead conductor 12 made of copper or nickel, for example, whereas the other end of the anode lead conductor 12 projects out of the case 50.

The inner space of the case 50 is filled with the nonaqueous electrolytic solution 30, a part of which is contained in the anode 10, cathode 20, and separator 40.

The nonaqueous electrolytic solution 30 is not restricted in particular, whereby nonaqueous electrolytic solutions (nonaqueous electrolytic solutions using organic solvents) used in known electrochemical capacitors such as electric double layer capacitors can be employed. When the electrochemical capacitor is an electric double layer capacitor, a nonaqueous electrolytic solution using an organic solvent (nonaqueous electrolytic solution) is preferably employed, since the aqueous electrolytic solutions have such an electrochemically low decomposition voltage that the tolerable voltage of the capacitor is limited to a low level.

The species of the nonaqueous electrolytic solution 30 is not restricted in particular, but is chosen in view of the solubility and degree of dissociation of solutes and the viscosity of the liquid in general, and is preferably a nonaqueous electrolytic solution having a high conductivity and a high potential window (high decomposition start voltage). Examples of the organic solvent include propylene carbonate, diethylene carbonate, and acetonitrile. Examples of the electrolyte include quaternary ammonium salts such as tetraethylammonium tetrafluoroborate (tetrafluoroboric tetraethylammonium). In this case, it is necessary to control the mingling moisture strictly.

As shown in FIGS. 1 and 2, the part of the anode lead 12 coming into contact with the seal part of the case constituted by the fringe 51B of the first film 51 and the fringe 52B of the second film 52 is covered with an adhesive layer 14 made of an adhesive (insulator) for sufficiently securing the adhesion between the anode lead 12 and each film and preventing the anode lead 12 and the metal layer 50c in the composite package film constituting the individual films from electrically coming into contact with each other. Further, the part of the cathode lead 22 coming into contact with the seal part of the case constituted by the fringe 51B of the first film 51 and the fringe 52B of the second film 52 is covered with an adhesive layer 24 made of an adhesive (insulator) for sufficiently securing the adhesion between the cathode lead 22 and each film and preventing the cathode lead 22 and the metal layer 50c in the composite package film constituting the individual films from electrically coming into contact with each other.

The adhesive to become a constituent material of the adhesive layers 14 and 24 is not restricted in particular as long as it is an adhesive containing a synthetic resin which can firmly adhere to both of a metal and a synthetic resin, but preferably is an adhesive containing as constituting material at least one species of resin selected from the group consisting of denatured polypropylene, denatured polyethylene, and an epoxy resin from the viewpoint of securing a sufficient adhesion. The adhesive layers 14 and 24 may be omitted if the adhesion of the composite package film to each of the anode lead 12 and cathode lead 22 can be secured while sufficiently preventing the leads from coming into contact with the metal layer in the composite package film.

A method of making the above-mentioned case 50 and electrochemical capacitor 1 (electric double layer capacitor) (a preferred manufacturing method in accordance with the present invention) will now be explained.

First, an example of making a matrix 60 (a laminate in which the anode 10, separator 40, and cathode 20 are successively laminated in this order) will be explained. In the following, a method of making an electrode to become the anode 10 and cathode 20 will be explained with reference to FIGS. 10 to 18.

Figure 10:
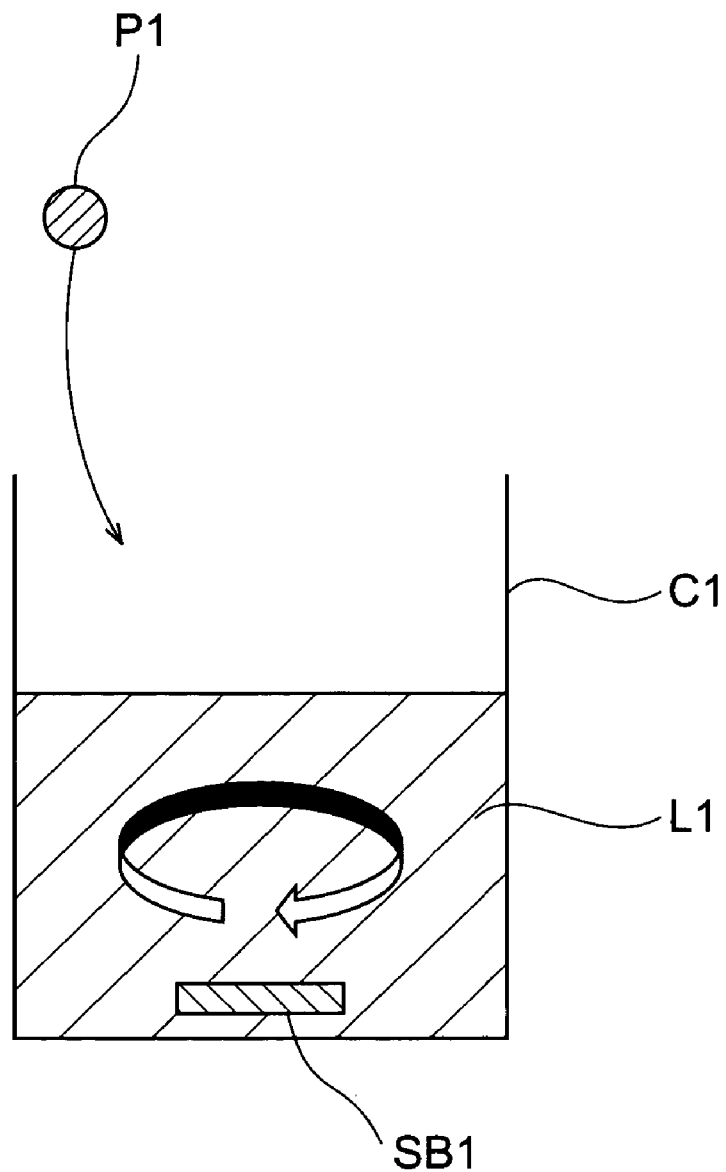
FIG. 10 is an explanatory view for explaining an absorbing step.
Figure 11:
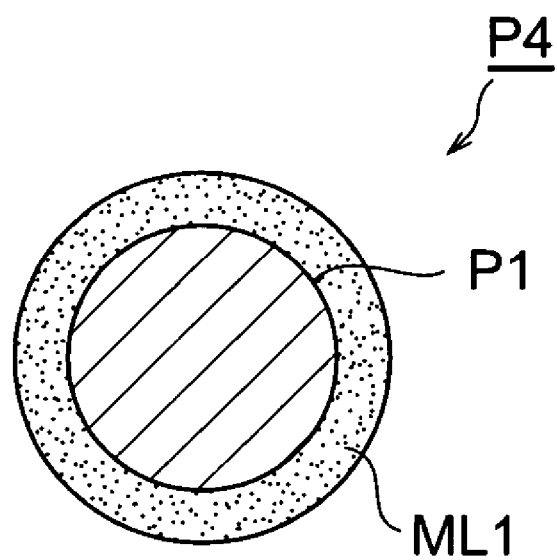
FIG. 11 is a schematic sectional view roughly showing a porous particle after absorption processing.
Figure 12A:
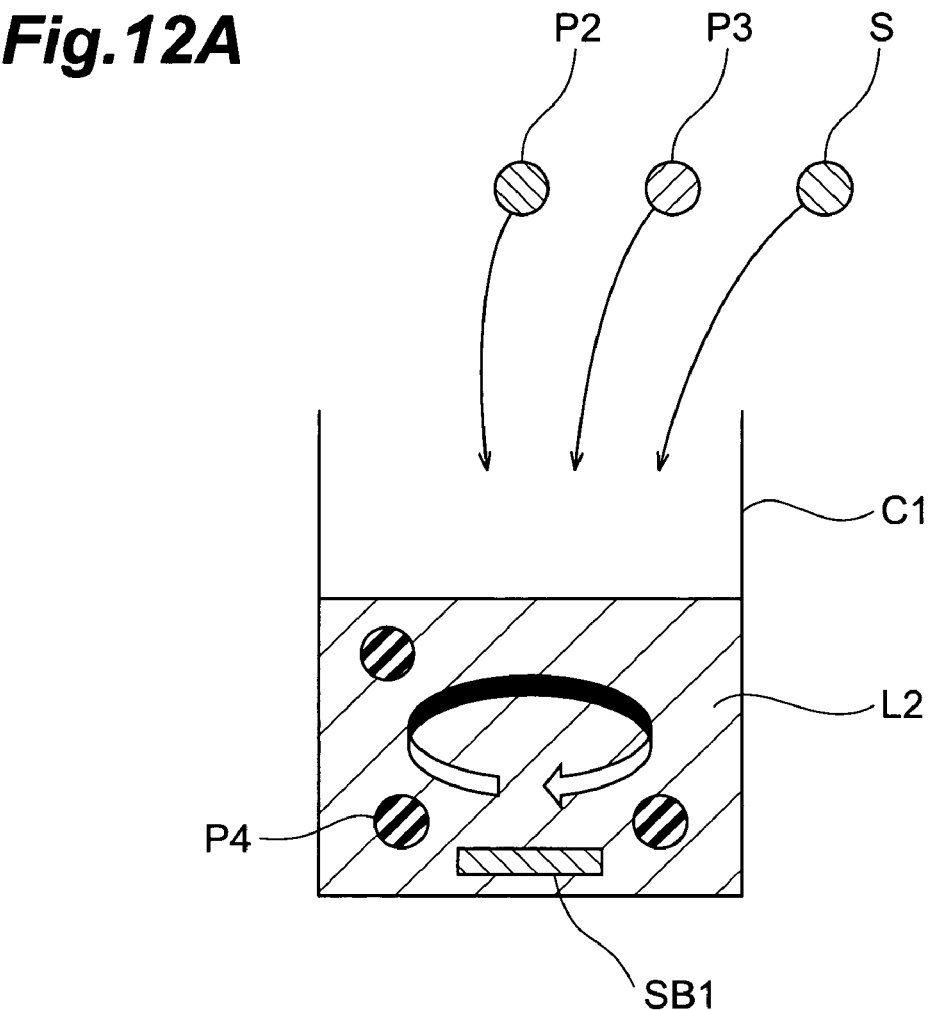
FIGS. 12A and 12B are explanatory views for explaining a step of preparing an electrode forming coating liquid.
Figure 12B:
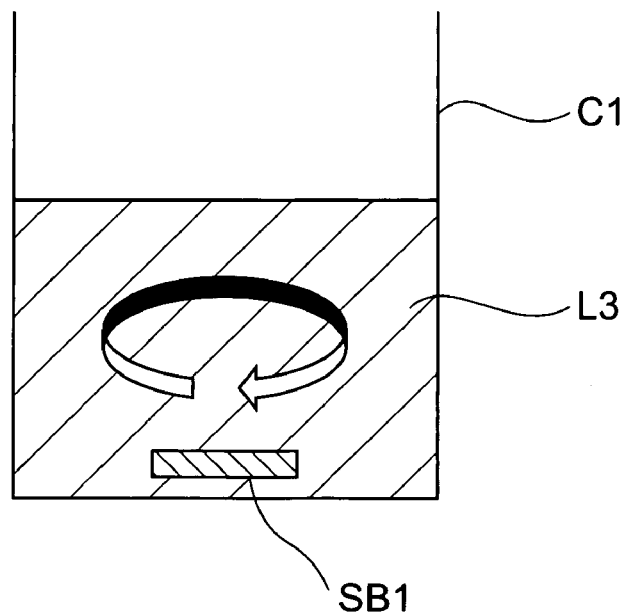
Figure 13:
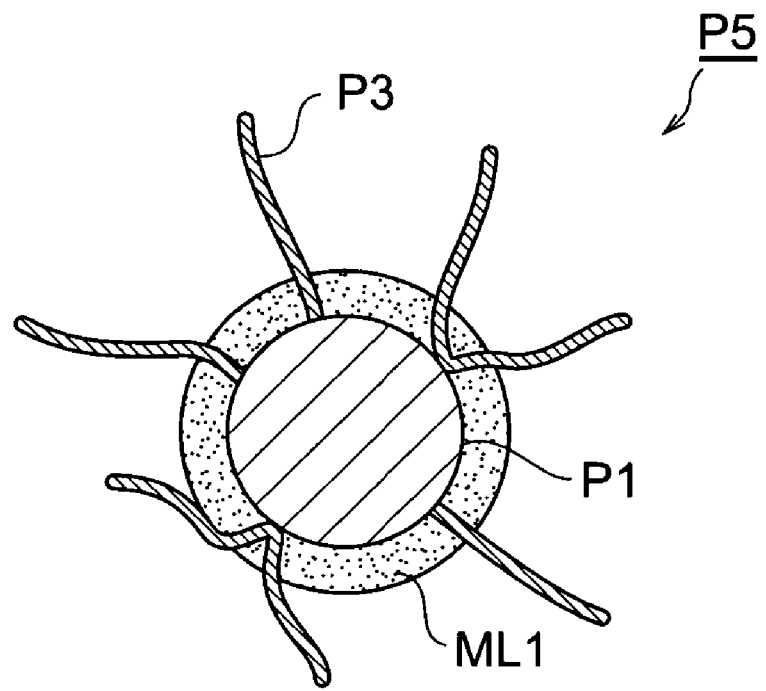
FIG. 13 is a schematic sectional view roughly showing the porous particle in the electrode forming coating liquid.
Figure 14:
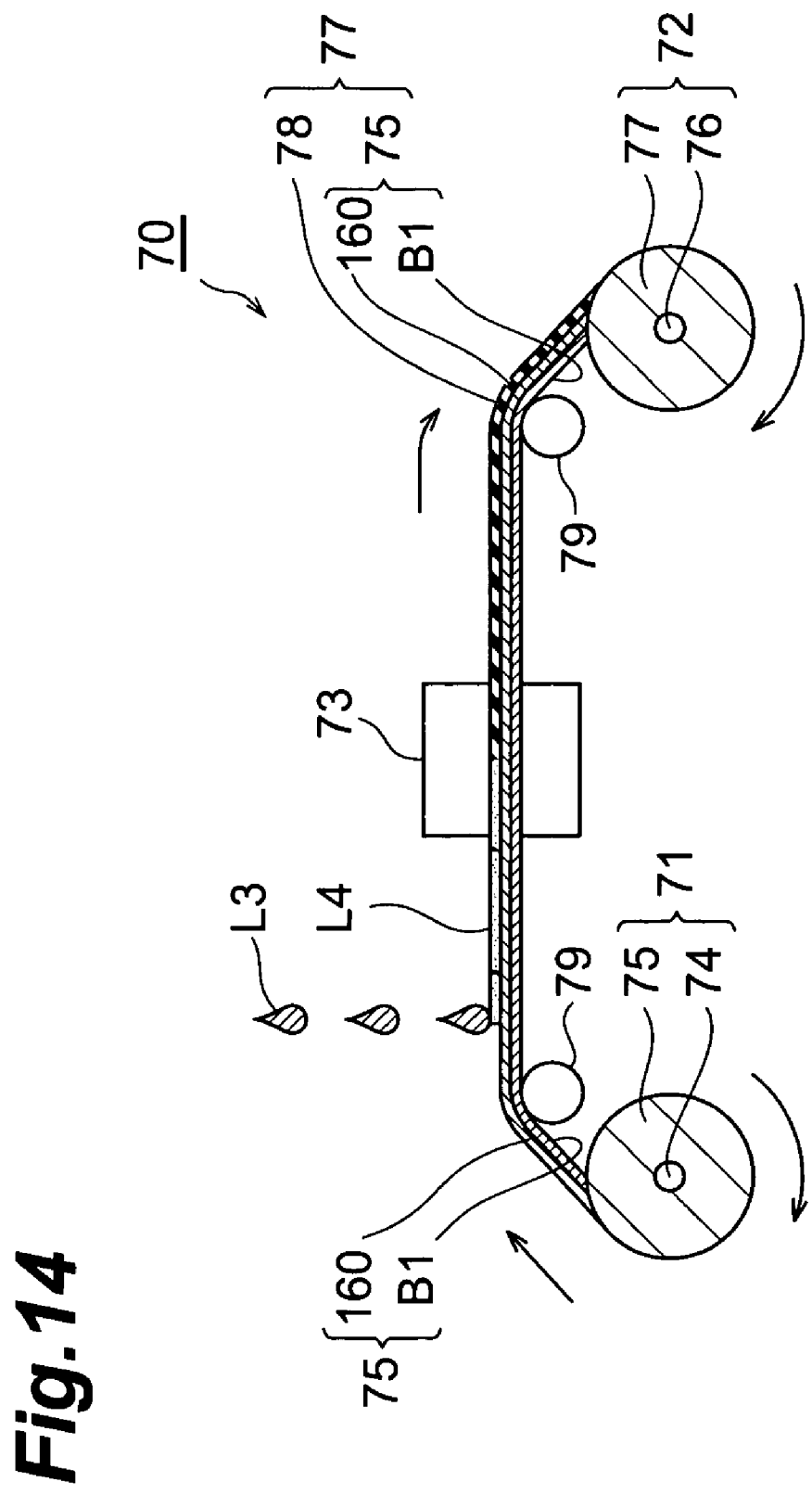
FIG. 14 is an explanatory view for explaining a step of forming an electrode sheet using the electrode forming coating liquid.
Figure 15:
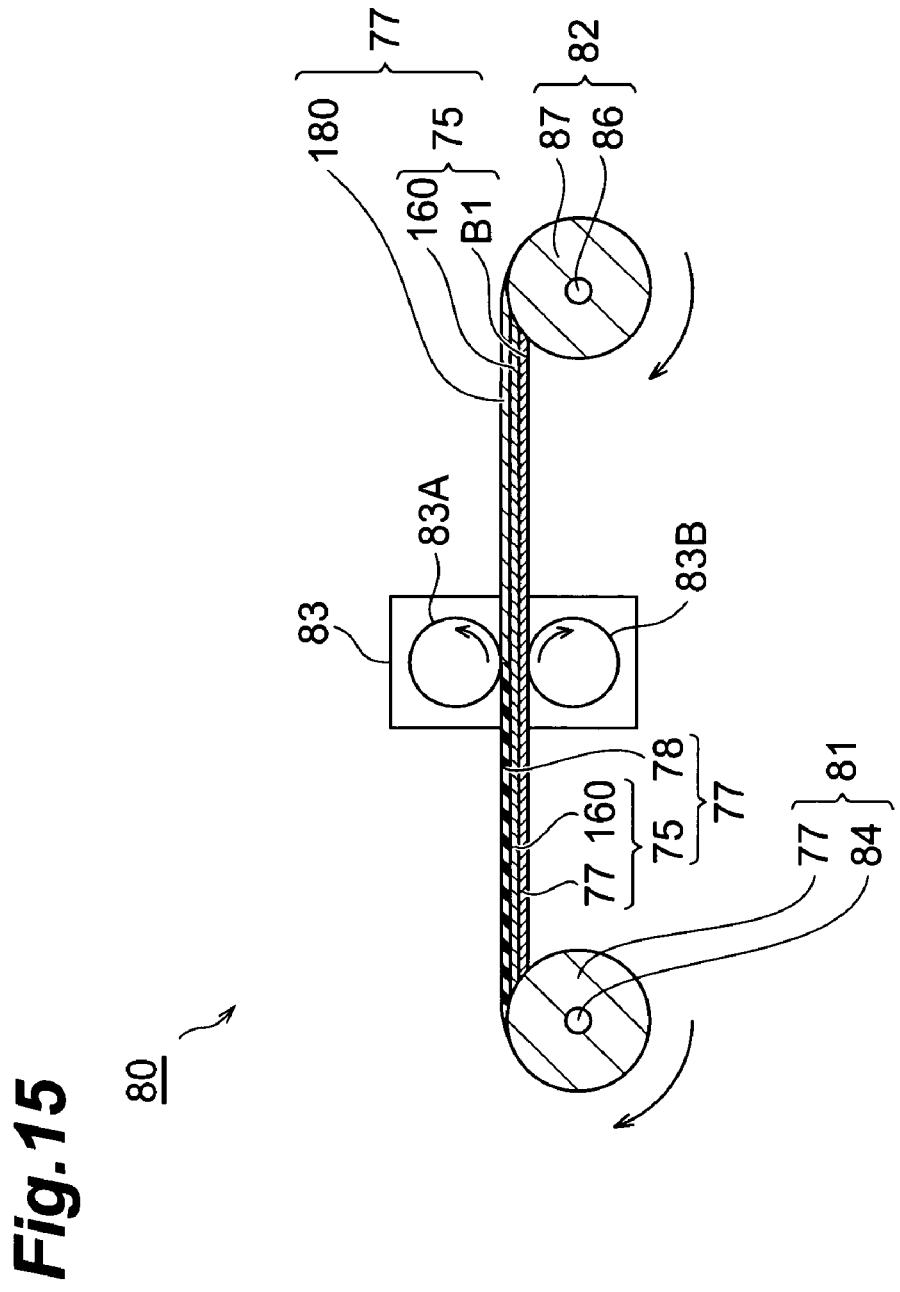
FIG. 15 is an explanatory view for explaining the step of forming an electrode sheet using the electrode forming coating liquid.
Figure 17:
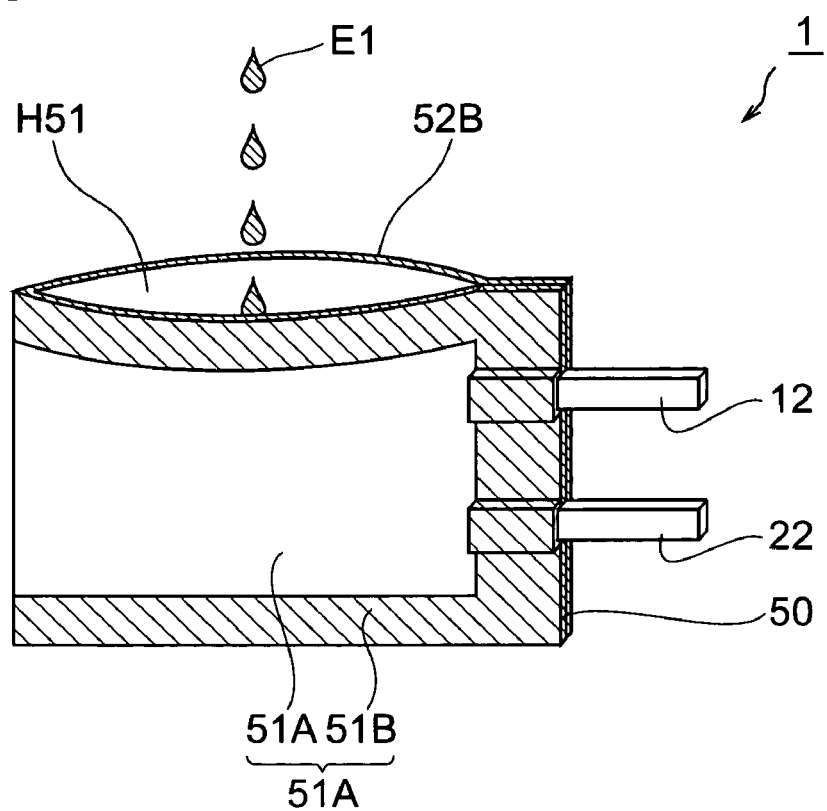
FIG. 17 is an explanatory view showing an example of procedure when filling a case with a nonaqueous electrolytic solution.
Figure 18:
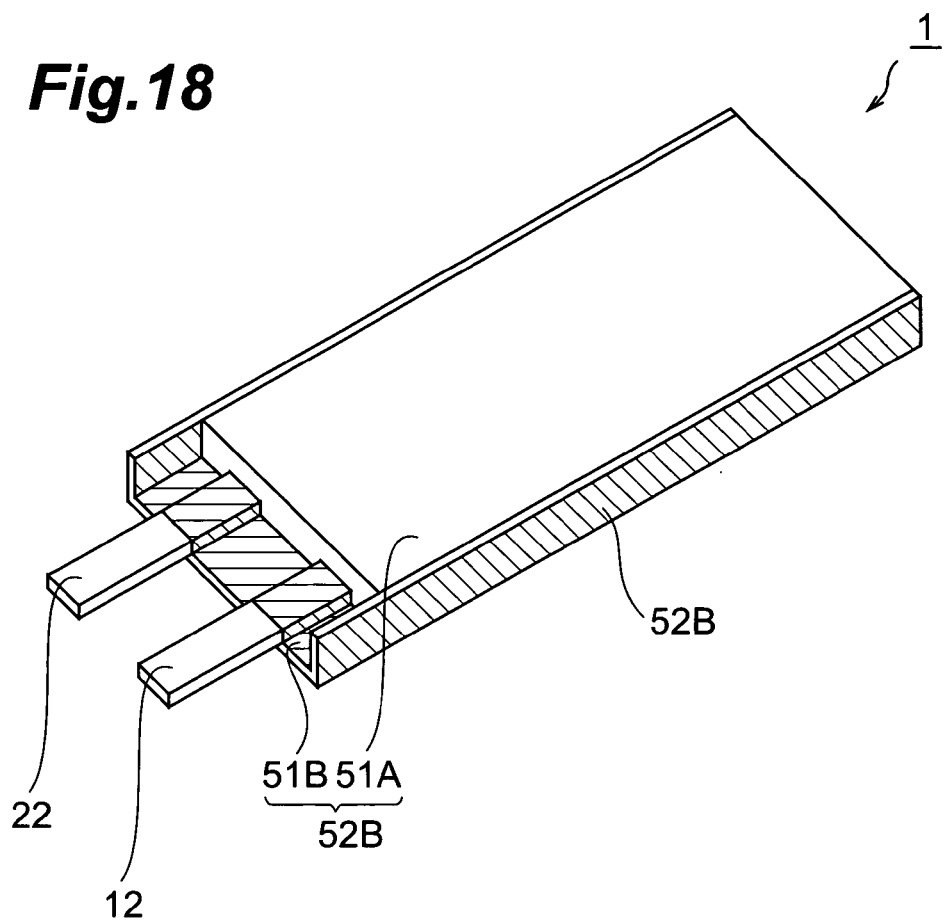
FIG. 18 is a perspective view showing an electrochemical capacitor when seal parts of the case are bent.
Figure 19:
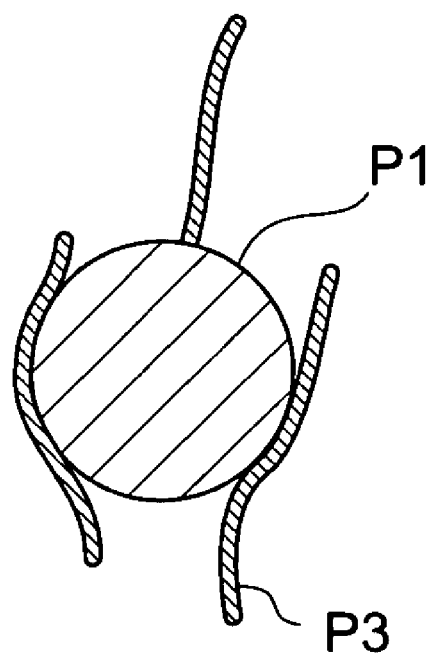
FIG. 19 is a schematic sectional view roughly showing a particle in which a binder is absorbed by a porous particle formed in a conventional electrode manufacturing method.

FIG. 10 is an explanatory view for explaining an absorbing step. FIG. 11 is a schematic sectional view roughly showing a porous particle after absorption processing. FIGS. 12A and 12B are explanatory views for explaining a step of preparing an electrode forming coating liquid. FIG. 13 is a schematic sectional view roughly showing the porous particle in the electrode forming coating liquid. FIGS. 14 and 15 are explanatory views for explaining a step of forming an electrode sheet using the electrode forming coating liquid. FIG. 16 is an explanatory view for explaining a step of forming an electrode from the electrode sheet. FIG. 17 is an explanatory view showing an example of procedure when filling a case with a nonaqueous electrolytic solution. FIG. 18 is a perspective view showing an electrochemical capacitor when seal parts of the case are bent. FIG. 19 is a schematic sectional view roughly showing a particle in which a binder is absorbed by a porous particle formed in a conventional electrode manufacturing method.

First, as shown in FIG. 10, a conductive porous particle P1 for use in an electrode is subjected to absorption processing in an absorbing step. In the absorbing step, before mixing the porous particle P1 and a binder, an organic solvent (preferably an organic solvent of the same species as with the organic solvent contained in the electrolytic solution 30 used in an electrochemical capacitor such as the electrochemical capacitor 1 mentioned above) usable as a nonaqueous electrolytic solution is absorbed by the porous particle P1.

Examples of the organic solvent used in this absorbing step include propylene carbonate, ethylene carbonate, gamma-butyrolactone, acetonitrile, and dimethylformamide. Among them, propylene carbonate is preferred. This is because propylene carbonate is widely used as a solvent of electric double layer capacitor electrolytic solutions, and hardly affects electric characteristics of electric double layer capacitors even when finally left being attached to porous particles. The manufacturing method in accordance with this embodiment is effective when the porous particle P1 has a specific surface area of at least 500 $m^2/g$. This is because a binder tends to be absorbed by the surface of the porous particle P1 when the porous particle P1 has a specific surface area of 500 $m^2/g$ or more in particular, and the porous particles P1 and the binder are mixed. This tendency becomes stronger when the porous particle P1 has a specific surface area of 700 $m^2/g$ or more. However, the specific surface area of the porous particle P1 is preferably not greater than 1500 $m^2/g$. This is because the porous particle P1 is less likely to disperse in a coating liquid which will be explained later, thereby yielding less sufficient functions as an electrode when the specific surface area of the porous particle P1 exceeds 1500 $m^2/g$ as compared with the case where the specific surface area is not greater than 1500 $m^2/g$.

The conductive porous particle P1 is put into a container C1 containing an organic solvent (preferably an organic solvent of the same species as with the organic solvent contained in the nonaqueous electrolytic solution 30 used in an electrochemical capacitor such as the electrochemical capacitor 1 mentioned above) L1 usable in a nonaqueous electrolytic solution and a stirring bar SB1, and they are stirred. This forms a liquid film ML1 made of the organic solvent L1 covering the surface of the porous particle (a particle having a spherical form in FIG. 11) as shown in FIG. 11. This liquid film ML1 can prevent a particle P3 made of a binder from covering the surface of the porous particle P1 so much in a later step that the surface cannot be utilized effectively.

Next, in a coating liquid preparing step, an electrode forming coating liquid L3 is prepared. As shown in FIG. 12A, a particle P2 constituted by a conductive auxiliary agent (carbon black, powder graphite, and the like mentioned above), a particle P3 made of a binder (PTFE, PVDF, PE, PP, fluorine rubber, and the like mentioned above), and a liquid S (preferably a liquid adapted to dissolve the particle P3 made of the binder) adapted to dissolve or disperse the particle P3 made of the binder and disperse the porous particle P4 and particle P2 are put into the remaining liquid L2 after the absorption processing containing porous particles P4 formed with the liquid film ML1 (a porous particle with a solvent), and they are stirred and mixed, so as to prepare the electrode forming coating liquid L3 (see FIG. 12B).

In the electrode forming coating liquid L3, a particle P5 in which the particles P3 made of the binder are absorbed by the porous particle P4 is formed as shown in FIG. 13. In the particle P5, the liquid film ML1 prevents the particles P3 made of the binder from covering the surface of the porous particle P1 in excess. The surface of the porous particle P1 usable for forming an electric double layer is sufficiently secured in the particle P5. By contrast, in the conventional method of making an electrode including no absorbing step, the liquid film ML1 is not formed on the surface of the porous particle P1, so that the particles P3 made of the binder covers the surface of the porous particle P1 in excess as shown in FIG. 19, whereby the surface usable for forming the electric double layer is not secured sufficiently.

Preferably, in the coating liquid preparing step, the content of the organic solvent contained in the electrode forming coating liquid L3 is adjusted so as to become 25 to 35 mass % based on the total mass of the liquid component in the electrode forming coating liquid. When the content of the organic solvent contained in the electrode forming coating liquid L3 is less than 25 mass %, the surface of the porous particle P1 cannot sufficiently be covered therewith, whereby electrode characteristics are more likely to deteriorate. When the content of the organic solvent contained in the electrode forming coating liquid L3 exceeds 35 mass %, the surface of the porous particle P1 is more likely to be coated in excess so that the adhesion of the particles P3 made of the binder to the surface of the porous particle P1 becomes insufficient as compared with the case where the content is 25 to 35 mass % as mentioned above.

Next, using the above-mentioned electrode forming coating liquid L3 and apparatus 70 and 80 shown in FIGS. 14 and 15, respectively, an electrode sheet ES10 shown in FIG. 16 is formed. The following will explain the method of forming the electrode sheet ES10 (see FIG. 16) for the anode 10 and the anode 10 obtained from the electrode sheet ES10, while omitting the method of forming the cathode 20 having a configuration similar to that of the anode 10.

The apparatus 70 shown in FIG. 14 is mainly constituted by a first roll 71, a second roll 72, a dryer 73 disposed between the first roll 71 and second roll 72, and two support rolls 79. The first roll 71 is composed of a cylindrical core 74 and a tape-like laminate sheet 75. One end of the laminate sheet 75 is connected to the core 74, about which the laminate sheet 75 is wound. The laminate sheet 75 has a configuration in which a metal foil sheet 160 is laminated on a base sheet B1.

The second roll 72 includes a cylindrical core 76 to which the other end of the laminate sheet 75 is connected. A core driving motor (not depicted) for rotating the core 76 of the second roll 72 is connected to the core 76, so that a laminate sheet 77 coated with the electrode forming coating liquid L1 and then dried in the dryer 73 is wound at a predetermined speed.

Initially, when the core driving motor revolves, the core 76 of the second roll 72 rotates, whereby the laminate sheet 75 wound about the core 74 of the first roll 71 is drawn out of the first roll 71. Subsequently, the electrode forming coating liquid L3 is applied onto the metal foil sheet 160 of the drawn laminate sheet 75 (coating step). This forms a coating L4 made of the electrode forming coating liquid L3 on the metal foil sheet 160.

Next, as the core driving motor revolves, the part of the laminate sheet 75 formed with the coating L4 is guided into the dryer 73 by the support rolls 79. In the dryer 73, the coating L4 on the laminate sheet 75 is dried, so as to form a layer 78 (hereinafter referred to as "precursor layer 78") to become a precursor of the porous layer 18 when formed into an electrode. Then, as the core driving motor revolves, the laminate sheet 77 in which the precursor layer 78 is formed on the laminate sheet 75 is guided to and wound about the core 76 by the support rolls 79.

Subsequently, using the above-mentioned laminate sheet 77 and the apparatus 80 shown in FIG. 15, the electrode sheet ES10 is made.

The apparatus 80 shown in FIG. 15 is mainly constituted by a first roll 81, a second roll 82, and a roller press 83 disposed between the first roll 81 and second roll 82. The first roll 81 is composed of a cylindrical core 84 and the above-mentioned tape-like laminate sheet 77. One end of the laminate sheet 77 is connected to the core 84, about which the laminate sheet 77 is wound. The laminate sheet 77 has such a configuration that the precursor layer 78 is further laminated on the laminate sheet 75 in which the metal foil sheet 160 is laminated on the base sheet B1.

The second roll 82 includes a cylindrical core 86 to which the other end of the laminate sheet 77 is connected. A core driving motor (not depicted) for rotating the core 86 of the second roll 82 is connected to the core 86, so that a laminate sheet 87 after being pressed by the roller press 83 is wound at a predetermined speed.

First, when the core driving motor revolves, the core 86 of the second roll 82 rotates, whereby the laminate sheet 77 wound about the core 84 of the first roll 81 is drawn out of the first roll 81. Subsequently, as the core driving motor revolves, the laminate sheet 77 is guided into the roller press 83. Disposed within the roller press 83 are two cylindrical rollers 83A and 83B. The rollers 83A and 83B are arranged such that the laminate sheet 77 can be inserted therebetween. The rollers 83A and 83B are placed such that, when the laminate sheet 77 is inserted between them, the side face of the roller 83A and the outer surface of the precursor layer 78 of the laminate sheet 77 come into contact with each other, whereas the side face of the roller 83B and the outer surface (rear face) of the base sheet B1 of the laminate sheet 77 come into contact with each other, and the laminate sheet 77 can be pressed at a predetermined temperature and pressure.

The cylindrical rollers 83A and 83B are provided with respective rotating mechanisms rotating in a direction conforming to the moving direction of the laminate sheet 77. The length between bottom faces in each of the cylindrical rollers 83A and 83B is not smaller than the width of the laminate sheet 77.

The precursor layer 78 on the laminate sheet 77 is heated and pressed in the roller press 83 as necessary, so as to become a porous layer 180 (the porous layer 18 when formed into an anode). Then, as the core driving motor revolves, the laminate sheet 87 in which the porous layer 180 is formed on the laminate sheet 77 is wound about the core 86.

Figure 16A:
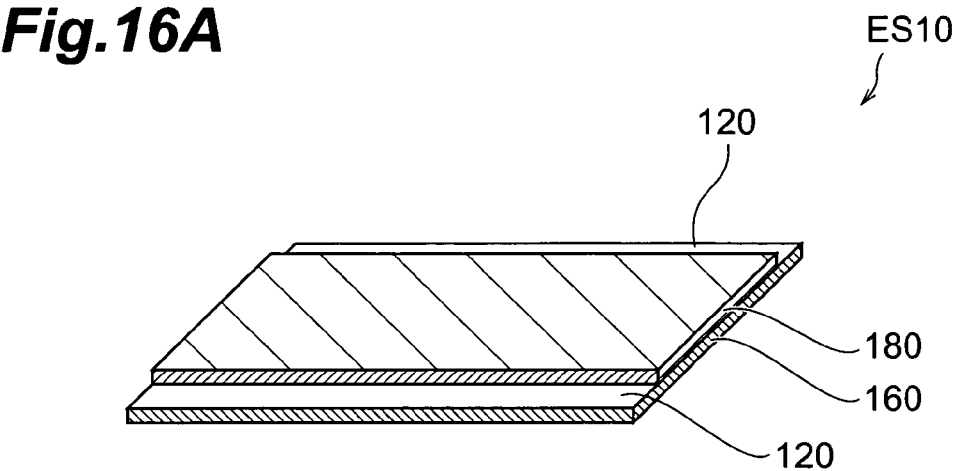
FIGS. 16A to 16C are explanatory views for explaining a step of forming an electrode from the electrode sheet.

Next, as shown in FIG. 16A, the laminate sheet 87 wound about the core 86 is cut into a predetermined size, so as to yield the electrode sheet ES10. The electrode sheet ES10 shown in FIG. 16A is formed with fringes 120 at which the surface of the metal foil sheet 160 is exposed. The fringes 120 can be formed by adjustably applying the electrode forming coating liquid L3 to only the center part of the metal foil sheet 160 of the laminate sheet 75, when the electrode forming coating liquid L3 is applied onto the metal foil sheet 160 of the laminate sheet 75.

Figure 16B:
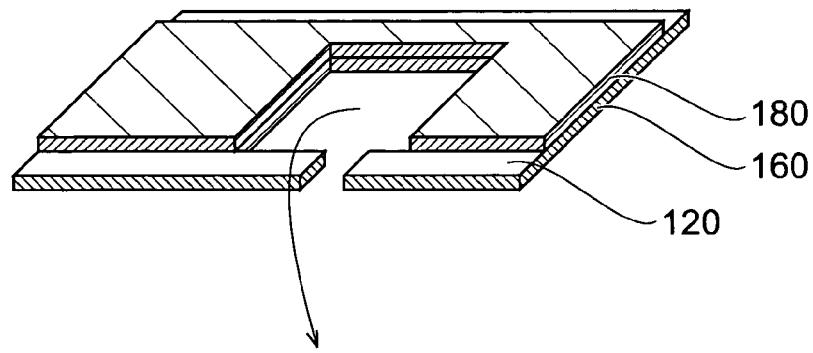
Figure 16C:
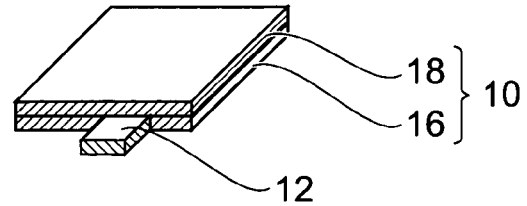

Subsequently, as shown in FIG. 16B, the electrode sheet ES10 is punched out in conformity to the scale of the electrochemical capacitor to be made, whereby the anode 10 shown in FIG. 16C is obtained. If the electrode sheet ES10 is punched out such that a part of the above-mentioned fringes 120 is included as an anode lead 12, the anode 10 can be obtained in a state integrated with the anode lead 12 beforehand. Here, the porous layer 180 and the metal foil sheet 160 become the porous layer 18 and collector layer 16, respectively. If not connected beforehand, the anode lead conductor 12 and cathode lead 22 are separately prepared and electrically connected to the anode 10 and cathode 20, respectively. The cathode 20 can be made as with the anode 10 as mentioned above.

Next, a separator 40 prepared separately is disposed between the anode 10 and cathode 20 while in contact therewith, whereby a matrix 60 is completed.

The separator 40 disposed between the anode 10 and cathode 20 in the electrochemical capacitor 1 has one surface in contact with the surface (hereinafter referred to as "inner face") of the anode 10 on the cathode 20 side and the other surface in contact with the surface (hereinafter referred to as "inner face") of the cathode 20 on the anode 10 side. Namely, the separator 40 is in contact with the anode 10 and cathode 20 but is not joined to them by thermocompression bonding or the like.

When the separator 40 is joined to the anode 10 and cathode 20 by thermocompression bonding or the like, 1) micropores or voids in both electrodes contributing to forming an electric double layer are collapsed, and 2) micropores in the separator 40 are partly collapsed, whereby the internal resistance increases. When the electrochemical capacitor is used as a small-size electrochemical capacitor having a small capacitor capacity mounted to a small-size electronic device, a small difference in internal resistance (impedance) remarkably affects discharging characteristics. As the internal resistance increases, the ohmic loss (IR loss) becomes greater, thereby lowering discharging characteristics. In particular, the ohmic loss may become so much that a large current cannot be discharged. Therefore, the electrochemical capacitor 1 (electric double layer capacitor) employs a configuration in which the separator 40 is in contact with the anode 10 and cathode 20 as mentioned above.

When a configuration in which the separator 40 is in contact with the anode 10 and cathode 20 as mentioned above is employed, it is necessary that the contact state between the separator 40 and anode 10 and the contact state between the separator 40 and the cathode 20 be regulated so as to minimize their respective voids. When the contact state between the separator 40 and anode 10 and the contact state between the separator 40 and anode 20 are insufficient, the internal resistance of the electrochemical capacitor 1 (electric double layer capacitor) increases, so that discharging characteristics deteriorate.

A method of making the case 50 will now be explained. When forming the first and second films from the above-mentioned composite package film, known manufacturing methods such as dry lamination, wet lamination, hotmelt lamination, and extrusion lamination are used.

For example, a film to become a layer made of a synthetic resin constituting the composite package film, and a metal foil made of aluminum or the like are prepared. The metal foil can be prepared by extending a metal material by applying pressure, for example.

The metal foil is bonded onto the film to become the layer made of the synthetic resin by way of an adhesive, and so forth, so as to yield a configuration preferably comprising a plurality of layers as mentioned above, thereby making a composite package film (multilayer film). Then, the composite package film is cut into a predetermined size, so as to prepare a rectangular film.

Subsequently, as previously explained with reference to FIG. 2, a single film 53 is folded, and the matrix 60 is arranged therein.

Next, thermal fusion is carried out in the parts where the first and second leads are to be arranged between the fringe (seal part 51B) to be thermally fused in the first film 51 and the fringe (seal part 52B) to be thermally fused in the second film 52 among the contact parts to be thermally fused in the first film 51 and second film 52. Here, from the viewpoint of more reliably attaining a sufficient sealing performance of the case 50, it will be preferred if the above-mentioned adhesive is applied to the surface of the anode lead 12. As a consequence, an adhesive layer 14 made of the adhesive contributing to the adhesion of the anode lead 12 and the first film 51 and second film 52 is formed therebetween after the thermal fusion. In the same procedure as that explained in the foregoing, a part surrounding the cathode lead 22 is subjected to thermal fusion simultaneously with or separately from the former thermal fusion, whereby the case 50 having a sufficient sealing performance can be formed.

Next, in the seal part 51B (fringe 51B) of the first film 51 and the seal part 52B (fringe 52B) of the second film 52, the part other than the above-mentioned parts surrounding the anode lead 12 and cathode lead 22 is heat-sealed (thermally fused) by a desirable seal width with a sealer under a predetermined heating condition, for example.

Here, as shown in FIG. 17, a part free of heat sealing is provided in order to secure an opening H51 for injecting the nonaqueous electrolytic solution 30. This yields the case 50 with the opening H51.

Then, as shown in FIG. 17, the nonaqueous electrolytic solution 30 is injected from the opening H51. Subsequently, a vacuum sealer is used for sealing the opening H51 of the case 50. Further, from the viewpoint of improving the volume energy density based on the space volume where the resulting electrochemical capacitor 1 is to be placed, the seal parts of the case 50 are bent as shown in FIG. 18 when necessary. Thus, the making of the case 50 and electrochemical capacitor 1 (electric double layer capacitor) is completed.

Though the preferred embodiment of the present invention is explained in detail in the foregoing, the present invention is not limited thereto. For example, in the explanation of the above-mentioned embodiment, seal parts of the electrochemical capacitor 1 may be bent, so as to form a more compact configuration. Though the electrochemical capacitor 1 comprising the anode 10 and cathode 20 one by one is explained in the above-mentioned embodiment, more than one set of anode 10 and cathode 20 with one separator 40 always being disposed therebetween may be provided.

Though the above-mentioned embodiment prepares the electrode forming coating liquid L3 by stirring and mixing the above-mentioned porous particle P4 with the solvent, the particle P3 made of the binder, the liquid S, and the like, and forming the coating liquid on the metal foil sheet 160, thereby making the anode 10 and cathode 20, the present invention can also make the anode 10 and cathode 20 without preparing the electrode forming coating liquid. For example, an electrode may be made by pulverizing a carbon material into particles having a size of about 5 to 100 μm; regulating their granularity; preparing a kneaded product by adding a conductive auxiliary agent for imparting conductivity and a binder, for example, to thus obtained carbon powder (porous particle) and kneading them (kneaded product preparing step); and extending the kneaded product so as to form a sheet. In this case, it is necessary that minute particles in which the carbon material is pulverized and carbon black be uniformly distributed and be entwined with PTFE fiber at substantially the same strength, so that it will be preferred if the kneading is sufficiently performed and repeated extending is conducted two-dimensionally. The above-mentioned effect of the present invention can also be obtained in this case if the carbon powder is subjected to absorption processing, and the carbon powder (porous particle) with the solvent obtained by the absorption processing is used in the above-mentioned kneaded product preparing step.

Though the above-mentioned embodiment mainly relates to the making of an electric double layer capacitor by the manufacturing method of the present invention, the electrochemical capacitor made by the manufacturing method of the present invention is not limited to the electric double layer capacitor, but is applicable to the making of electrochemical capacitors such as pseudocapacity capacitors, pseudocapacitors, and redox capacitors.

Though the absorbing step of the above-mentioned embodiment uses the organic solvent L1, at least one species of components identical to components contained in the nonaqueous electrolytic solution other than the organic solvent and binder may further be added to the organic solvent used in the absorbing step. In this case, the components other than the organic solvent and binder are preferably electrolyte components contained in the nonaqueous electrolytic solution. In this case, from the same viewpoint as that mentioned above, it will be more preferable if a component other than the organic solvent and binder is further added to the organic solvent used in the absorbing step, so as to prepare a solution having the same composition as that of the nonaqueous electrolytic solution, and cause the porous particle to absorb thus prepared solution.

The electrolyte contained in the solution having the same composition as that of the nonaqueous electrolytic solution is not restricted in particular as long as it is an electrolyte usable in the nonaqueous electrolytic solution, but is preferably a quaternary ammonium salt. Examples of the quaternary ammonium salt include tetrafluoroboric tetraethylammonium, tetrafluoroboric triethylmethylammonium, tetrafluorophosphoric tetraethylammonium, and tetrafluorophosphoric triethylmethylammonium.

Though the porous particle is subjected to the absorbing step before mixing the porous particle and the binder in the above-mentioned embodiment, the absorbing step can be omitted if a porous particle with a solvent in which the above-mentioned organic solvent exists beforehand on the surface of the porous particle can be prepared.

In the following, the electrochemical capacitor in accordance with the present invention will be explained in more detail with reference to Examples and Comparative Examples, which do not restrict the present invention at all.

EXAMPLE 1

In the following procedure, an electrochemical capacitor (electric double layer capacitor) having the same configuration as with the electrochemical capacitor shown in FIG. 1 was made.

(1) Making of Electrode

An anode (polarizable electrode) and a cathode (polarizable electrode) each having an electrode area of 16.5 $cm^2$ was made by the following procedure. First, particles made of spherical activated carbon (product name "BP20" manufactured by Kuraray Chemical Co., Ltd.) were subjected to absorption processing. Propylene carbonate (hereinafter referred to as "PC") was employed as a liquid used for the absorption processing.

Subsequently, a binder [fluorine resin (product name "Viton-GF" manufactured by DuPont)], a conductive auxiliary agent (acetylene black), and MIBK (methylisobutylketone) which was a solvent adapted to dissolve the binder were put into the liquid containing activated carbon remaining after the absorption processing, and they were stirred and mixed, so as to prepare an electrode forming coating liquid (hereinafter referred to as "coating liquid L1"). Here, the mass ratio of activated carbon, binder, and conductive auxiliary agent was adjusted such that activated carbon (before absorption processing):binder:conductive auxiliary agent=86:5:9. The amount of addition of MIBK (methylisobutylketone) was adjusted such that the content of the nonaqueous electrolytic solution in the liquid remaining after the processing became 33 mass %.

Next, this coating liquid L1 was uniformly applied onto one surface of a collector (having a thickness of 50 μm) made of an aluminum foil. Then, the liquid component was eliminated from the coating by drying, and the laminate composed of the collector and the dried coating was pressed with pressure rolls, so as to make an electrode (hereinafter referred to as "electrode E1") in which an electronically conductive porous layer (having a thickness of 120 μm) was formed on one surface of the collector (having a thickness of 50 μm) made of the aluminum foil. Subsequently, this electrode E1 was cut into a rectangle (having an area of 16.5 $cm^2$), which was then dried under vacuum for at least 12 hours at a temperature of 150° C. to 175° C., so as to remove the moisture absorbed by the surface of the electronically conductive porous layer, thereby making the anode and cathode to be mounted to the electrochemical capacitor in accordance with Example 1, each having a size regulated by punching.

The coating liquid L1 was adjustably applied to the aluminum foil such that fringes of the aluminum foil were free of the coating liquid L1, whereby the anode and cathode each integrated beforehand with a lead (having a width of 10 mm, a length of 8 mm, and a thickness of 50 μm) shown in FIG. 16C were obtained.

(2) Making of Electrochemical Capacitor

First, the anode and cathode were opposed to each other, a separator made of a regenerated cellulose nonwoven fabric (31 mm×57 mm with a thickness of 0.30 mm) was disposed therebetween, and a laminate (matrix) in which the anode, separator, and cathode were laminated in this order was formed. By ultrasonic welding, respective leads (each having a width of 10 mm, a length of 25 mm, and a thickness of 0.50 mm) were connected to the anode and cathode of this laminate.

Subsequently, as a flexible composite package film, a laminate (having a thickness of 20 μm and a size of 130.0 mm×110.0 mm) in which an innermost layer made of a synthetic resin (a layer made of denatured polypropylene having a thickness of 40 µm) in contact with the nonaqueous electrolytic solution, a metal layer (having a thickness of 40 µm) made of an aluminum foil, and a layer made of polyamide (having a thickness of 20 µm) were successively laminated in this order was prepared.

Then, the composite package film was folded into two, and the matrix 60 was arranged. Here, the anode lead conductor 12 and cathode lead 22 of the matrix 60 were fitted into respective parts deformed by drawing of the composite package film.

At that time, the anode lead and cathode lead were surrounded with acid-denatured propylene films (each having a thickness of 100 µm) as the above-mentioned adhesive layers 14 and 24, respectively.

Next, the surroundings of the anode lead and cathode lead were subjected to thermal fusion. The thermal fusion was performed for 10 seconds at 185° C. while the pressure applied to fringes of the composite package film was 0.05 Pa.

Subsequently, among the seal parts of the two composite package films, the parts other than the above-mentioned surroundings of the anode lead 12 and cathode lead 22 were heat-sealed (thermally fused) by a seal width of 4 mm with a sealer. Here, an unsealed part was provided in order to secure an opening for injecting the nonaqueous electrolytic solution 30 as shown in FIG. 17.

Then, a nonaqueous electrolytic solution (a propylene carbonate solution containing 1.2 mol/L of triethylmethylammonium tetrafluoroborate) having the same composition as with the absorption processing liquid was injected into the case from the above-mentioned opening. Subsequently, the opening H51 of the case 50 was sealed with a vacuum sealer. Thus, an electrochemical capacitor was made.

EXAMPLE 2

An electrochemical capacitor was made by the same procedure under the same condition as with the electrochemical capacitor of Example 1 except that the content of the absorption processing liquid contained in the electrode forming coating liquid was adjusted as shown in FIG. 20.

EXAMPLE 3

An electrochemical capacitor was made by the same procedure under the same condition as with the electrochemical capacitor of Example 1 except that particles made of fibrous activated carbon (product name "FR25" manufactured by Kuraray Chemical Co., Ltd.) were employed in place of the particles made of spherical activated carbon "BP20" used in Example 1 and that the content of the absorption processing liquid contained in the electrode forming coating liquid was regulated as shown in FIG. 20.

EXAMPLE 4

An electrochemical capacitor was made by the same procedure under the same condition as with the electrochemical capacitor of Example 3 except that the content of the absorption processing liquid contained in the electrode forming coating liquid was regulated as shown in FIG. 20.

COMPARATIVE EXAMPLE 1

An electrochemical capacitor was made by the same procedure under the same condition as with the electrochemical capacitor of Example 1 except that the absorption processing performed in Example 1 was not carried out. Here, the above-mentioned TEMA.BF$_4$/PC solution and MIBK, which was a solvent adapted to dissolve the binder, were used as the liquid component of the electrode forming coating liquid, and the content of PC in the liquid component of the electrode forming coating liquid was adjusted to 30 mass %.

COMPARATIVE EXAMPLE 2

An electrochemical capacitor was made by the same procedure under the same condition as with the electrochemical capacitor of Example 1 except that the absorption processing performed in Example 1 was not carried out and that particles made of fibrous activated carbon (product name "FR25" manufactured by Kuraray Chemical Co., Ltd.) were employed in place of the particles made of spherical activated carbon "BP20" used in Example 1. Here, the above-mentioned PC solution and MIBK, which was a solvent adapted to dissolve the binder, were used as the liquid component of the electrode forming coating liquid, and the content of PC in the liquid component of the electrode forming coating liquid was adjusted to 33 mass %.

COMPARATIVE EXAMPLE 3

An electrochemical capacitor was made by the same procedure under the same condition as with the electrochemical capacitor of Comparative Example 2 except that the above-mentioned TEMA.BF$_4$/PC solution and MIBK, which was a solvent adapted to dissolve the binder, were used as the liquid component of the electrode forming coating liquid and that the content of PC in the liquid component of the electrode forming coating liquid was adjusted to 42 mass %.

Characteristic Evaluation Tests of Electrochemical Capacitors

The following characteristics of the electrochemical capacitors (electric double layer capacitors) in accordance with Examples 1 to 4 and Comparative Examples 1 to 3 were measured.

First, using a charging/discharging tester, low-current charging was performed at 0.5 C, while monitoring the voltage rising as each electric double layer capacitor accumulated electric charges. After the potential reached 2.5 V, the charging was shifted to constant voltage charging (moderate charging), and the charging was terminated when the current became 1/10 of the charging current. Here, the total charging time (i.e., charging time+moderate charging time) depended on the capacitance of the cell. Then, constant-current discharging at 0.5 C was performed for discharging until the final voltage became 0 V. After this test, charging was performed with a current of 1 C, and was shifted to constant-voltage charging after the potential reached 2.5 V. The charging was terminated when the current became 1/10 of the charging current. Then, constant-current discharging at 1 C was performed for discharging until the final voltage became 0 V. Thereafter, charging was started again. The foregoing process was repeated 10 times.

The capacity of each electrochemical capacitor (the capacitance of the cell of the electrochemical capacitor) was determined as follows. Namely, the discharging energy (the total charging energy [W·s] as the time integral of discharging voltage×current) was determined from the discharging curve (discharging voltage vs. discharging time), and the capacity (capacitor capacity) [F] of the evaluated cell was determined by using the relational expression of capacitor capacity [F]=2×total discharging energy [W·s]/(discharging start voltage [V])$^2$.

Subsequently, the capacity and internal resistance of each electrochemical capacitor were measured at a measurement environment temperature of 25° C. and a relative moisture of 60%. The internal resistance was measured by the following procedure. Namely, the internal resistance was calculated from the amount of change in voltage when a current of 10 mA flowed at a frequency of 1 kHz.

FIG. 20 shows the results of characteristic evaluation tests of the electrochemical capacitors in accordance with Examples 1 to 4 and Comparative Examples 1 to 3.

The results shown in the table of FIG. 20 have proved that Examples 1 to 4 yield electrodes whose internal resistances are sufficiently lower than those of Comparative Examples 1 to 3.

This fact has verified that the method of making an electrochemical capacitor electrode in accordance with the present invention can yield an electrochemical capacitor electrode whose internal resistance is sufficiently lowered.

INDUSTRIAL APPLICABILITY

As explained in the foregoing, the method of making an electrochemical capacitor electrode in accordance with the present invention can form an electrochemical capacitor electrode having a fully lowered internal resistance and excellent electrode characteristics easily and reliably. Also, the method of making an electrochemical capacitor in accordance with the present invention can form an electrochemical capacitor having excellent charging/discharging characteristics easily and reliably.

The invention claimed is:

1. A method of making an electrochemical capacitor electrode comprising a collector and an electronically conductive porous layer formed on the collector, the porous layer containing at least an electronically conductive porous particle and a binder adapted to bind the porous particle; the method comprising:
    a mixing step of mixing the binder and a porous particle with a solvent including an organic solvent usable in a nonaqueous electrolytic solution, the organic solvent existing on a surface of the porous particle.

2. A method of making an electrochemical capacitor electrode according to claim 1, wherein the organic solvent usable in the nonaqueous electrolytic solution is an organic solvent of the same species as with an organic solvent contained in a nonaqueous electrolytic solution constituting an electrochemical capacitor together with the electrode.

3. A method of making an electrochemical capacitor electrode according to one of claim 1, comprising:
    a coating liquid preparing step of preparing an electrode forming coating liquid containing the porous particle with the solvent, the binder, and a liquid adapted to dissolve or disperse the binder; and
    a porous layer forming step of applying the coating liquid onto the collector and then removing the liquid and the organic solvent, so as to form the porous layer.

4. A method of making an electrochemical capacitor electrode according to claim 3, wherein, in the coating liquid preparing step, the content of the organic solvent contained in the electrode forming coating liquid is adjusted to 25 to 35 mass % based on the total mass of the liquid component in the electrode forming coating liquid.

5. A method of making an electrochemical capacitor electrode according to one of claim 1, comprising:
    a kneaded product preparing step of kneading a mixture containing the porous particle with the solvent and the binder, so as to prepare an electrode forming kneaded product; and
    a porous layer forming step of forming the porous layer on the collector by using the kneaded product.

6. A method of making an electrochemical capacitor electrode according to claim 1, wherein at least one species of component identical to a component other than the organic solvent and binder usable in the nonaqueous electrolytic solution is further added to the organic solvent.

7. A method of making an electrochemical capacitor electrode according to claim 6, wherein the component other than the organic solvent and binder is an electrolyte component contained in the nonaqueous electrolytic solution.

8. A method of making an electrochemical capacitor electrode according to claim 6, wherein a component other than the organic solvent and binder is further added to the organic solvent so as to prepare a solution having the same composition as with the nonaqueous electrolytic solution, and thus obtained solution is absorbed by the porous particle.

9. A method of making an electrochemical capacitor electrode according to claim 1, wherein the binder is a fluorine-based resin soluble in a ketone-based solvent without dissolving in the organic solvent or a solution further containing a component identical to a component other than the organic solvent contained in the nonaqueous electrolytic solution.

10. A method of making an electrochemical capacitor electrode according to claim 1, wherein the porous particle with the solvent, the binder, and a liquid adapted to dissolve or disperse the binder are mixed in the mixing step so as to prepare an electrode forming coating liquid in the mixing step;
    the method of making an electrochemical capacitor electrode further comprising:
    a porous layer forming step of applying the coating liquid onto the collector and then removing the liquid and the organic solvent so as to form the porous layer.

11. A method of making an electrochemical capacitor according to claim 10, wherein both the first and second electrodes are made by the method of making an electrochemical capacitor electrode.

12. A method of making an electrochemical capacitor electrode according to claim 1, comprising:
    a kneaded product preparing step of kneading a mixture of the porous particle with the solvent and the binder obtained by the mixing step, so as to prepare an electrode forming kneaded product; and
    a porous layer forming step of forming the porous layer on the collector by using the kneaded product.

13. A method of making an electrochemical capacitor comprising first and second electrodes opposing each other; an insulating separator disposed between the first and second electrodes while in contact therewith; a nonaqueous electrolytic solution; and a case for accommodating the first and second electrodes, separator, and nonaqueous electrolytic solution in a closed state;
    wherein at least one of the first and second electrodes is made by the method of making an electrochemical capacitor electrode according to claim 1.

14. A method of making an electrochemical capacitor according to claim 13, wherein the separator is formed from an insulating porous body; and wherein the first electrode, second electrode, and separator are at least partly impregnated with at least a part of the nonaqueous electrolytic solution.

15. A method of making an electrochemical capacitor electrode comprising a collector and an electronically conductive porous layer formed on the collector while in electric contact therewith, the porous layer containing at least an electronically conductive porous particle and a binder adapted to bind the porous particle; the method comprising:

an absorbing step of causing the porous particle to absorb an organic solvent usable in a nonaqueous electrolytic solution so as to yield a porous particle with a solvent including the organic solvent existing on a surface of the porous particle before a mixing step of mixing the porous particle and the binder.

16. A method of making an electrochemical capacitor electrode according to claim 15, wherein the organic solvent usable in the nonaqueous electrolytic solution is an organic solvent of the same species as with an organic solvent contained in a nonaqueous electrolytic solution constituting an electrochemical capacitor together with the electrode.

17. A porous particle with a solvent in an electrode forming coating liquid, wherein a liquid film made of an organic solvent covers the surface of the porous particle having an electronic conductivity and the content of the organic solvent is 25 to 35 mass % based on the total mass of the liquid component in the electrode forming coating liquid.

18. The porous particle with the solvent according to claim 17, wherein the organic solvent is propylene carbonate.

19. The porous particle with the solvent according to claim 17, wherein the porous particle has a specific surface area of at least 500 $m^2/g$.

* * * * *